(12) United States Patent
Myers (10) Patent No.: US 9,420,262 B1
(45) Date of Patent: Aug. 16, 2016

(54) GYROSCOPIC TWO DIMENSIONS OF FREEDOM PHOTOGRAPHY SYSTEM AND METHOD

(71) Applicant: Matthew Myers, Wilton Manors, FL (US)

(72) Inventor: Matthew Myers, Wilton Manors, FL (US)

( * ) Notice: Subject to any disclaimer, the term of this patent is extended or adjusted under 35 U.S.C. 154(b) by 334 days.

(21) Appl. No.: 14/212,497

(22) Filed: Mar. 14, 2014

Related U.S. Application Data (60) Provisional application No. 61/792,964, filed on Mar. 15, 2013.

(51) Int. Cl.
*A61B 17/02* (2006.01)
*H04N 13/02* (2006.01)

(52) U.S. Cl.
CPC .................................. *H04N 13/0221* (2013.01)

(58) Field of Classification Search
CPC ......................................................... A61B 17/02
USPC ............................................................ 348/50
See application file for complete search history.

(56) References Cited

U.S. PATENT DOCUMENTS

| | | | |
|---|---|---|---|
| 1,837,826 A | 12/1931 | Mitchell et al. | |
| 2,210,454 A | 8/1940 | Harvey | |
| 3,251,284 A | 5/1966 | Ratliff, Jr. | |
| 5,113,213 A | 5/1992 | Sandor et al. | |
| 6,827,446 B2 | 12/2004 | Beckett et al. | |
| 7,443,392 B2 | 10/2008 | Tsubaki | |
| 8,319,938 B2 * | 11/2012 | Pace | G03B 19/22 348/47 |
| 8,842,165 B2 * | 9/2014 | Wada | H04N 13/0239 348/47 |
| 9,161,020 B2 * | 10/2015 | Zhen | H04N 13/0239 |
| 2010/0195891 A1 | 8/2010 | Shu | |
| 2010/0284605 A1 | 11/2010 | Rau et al. | |
| 2011/0234767 A1 | 9/2011 | Tokiwa | |
| 2014/0005484 A1 * | 1/2014 | Charles | A61B 17/02 600/201 |

* cited by examiner

*Primary Examiner* — Paulos M Natnael
(74) *Attorney, Agent, or Firm* — Malin Haley DiMaggio & Bowen, P.A.

(57) ABSTRACT

An imaging platform and camera system with an oscillating platform having two dimensions or degrees of freedom of movement having three parallel axes about a single mounting position, an accelerometer, light meters, central processing unit, software techniques and sequence of imaging methodology to create a matrix of images by converting XYZ data into a 2-D matrix. A set of images, tagged with XYZ data at a range of degrees, are placed into the matrix. Adjacent, corresponding and opposite images for specific locations and object placement are captured. Patterns are created from sets of images previously photographed from exact XYZ coordinates that correspond to the 2-D matrix pattern, creating an illusion of 3-D oscillation of the objects, including dynamic texture, color and glimmer.

17 Claims, 8 Drawing Sheets

GYROSCOPIC TWO DIMENSIONS OF FREEDOM PHOTOGRAPHY SYSTEM AND METHOD

CROSS REFERENCE TO RELATED APPLICATIONS

This application claims the benefit of U.S. Provisional Application No. 61/792,964 filed on Mar. 15, 2013.

STATEMENT REGARDING FEDERALLY SPONSORED RESEARCH OR DEVELOPMENT

N/A

BACKGROUND OF THE INVENTION

1. Field of the Invention

The present invention generally relates to photography and more particularly to a system and method of accurately capturing the texture, depth, and true color of an object or material gyroscopically and using a gyroscopic device to view the resultant images.

2. Description of Related Art

Stereoscopic imaging systems and three-dimensional image processing are known in the art. For example, U.S. Patent Publication No. 2010/0284605 entitled Methodology to Optimize and Provide Streaming Object Rotation Using Composite Images illustrates a system presenting various sequences of images and photographs for viewing on a Web browser, which avoids the necessity of loading an entire image set in connection with the 3-D display of a particular product. The goal is to represent a rotating object from a set of images taken at certain angles using a fixed camera or a turntable device. A technique is utilized to significantly reduce loading time of captured images and a prioritizing scheme for particular images to achieve the end result.

U.S. Patent Publication No. 2011/0234767 is entitled Stereoscopic Imaging Apparatus and relates to obtaining stereoscopic images for photographic scenes. This apparatus incorporates first and second imaging sections and having a single photographic lens, as well as a single-eye 3-D sensor which includes a plurality of pixel groups for photo-electric conversion of luminous fluxes which have passed through different regions of the photographic lens.

U.S. Pat. No. 7,443,392 is entitled Image Processing Program for 3-D Display, Image Processing Apparatus, and 3-D Display System which describes a program that acquires first and second parameters associated with a 3-D display on first and second 3-D display devices, in sequential steps of acquiring first and second image data and generating composite or multi-viewpoint images.

Despite the state of the art and representative disclosures, conventional technology and methods do not provide for, or offer solutions to, the problems addressed improvements achieved through the instant inventions.

SUMMARY OF THE INVENTION

In many situations it is desirable to view and inspect the texture, surface depth, glimmer, and true color of an object or material, such as a diamond or a textile, without actually having the object or material in your hands. The difficulty, of course, is that commonly available computer systems, cameras, and displays are artificially recreating the texture and true color of an object electronically and therefore there is necessarily some distortion and discrepancy in the recreation. While there have been many attempts at developing systems to actually photograph and re-create lifelike images of objects or materials, the final results have left much to be desired as far as actually recreating and portraying surface texture, depth, and color. Currently, in a typical setting, a user viewing an image on a computer or mobile device is presented with as single image that only displays one aspect of how light interacts with the surface of the object or material. Such an image necessarily cannot showcase the true color, texture, depth, and glimmer of the object or material. While 3-D or "stereoscopic" devices have been invented and used to generate 3-dimensional representations of objects and material, none adequately captures the surface texture, depth, and true color of an object or material. Accordingly, there is a need in the art for a more robust system and method for electronically capturing and accurately displaying the surface texture, depth, glimmer, and true color of an object or material.

It is, therefore, to the effective resolution of the aforementioned problems and shortcomings of the prior art that the present invention is directed. However, in view of the photography systems and methods in existence at the time of the present invention, it was not obvious to those persons of ordinary skill in the pertinent art as to how the identified needs could be fulfilled in an advantageous manner.

The instant inventions provide a unique imaging platform and camera system with a platform having two dimensions or degrees of freedom of movement having three parallel axes about a single mounting position, an accelerometer, light meters, central processing unit, software techniques and sequence of imaging methodology to create a matrix of images by converting XYZ data into a 2-D matrix. A set of images, tagged with XYZ data at a range of degrees, are placed into the matrix. Adjacent, corresponding and opposite images for specific locations and object placement are captured, and then input into the matrix. Patterns are created from sets of images previously photographed from exact XYZ coordinates that correspond to the 2-D matrix pattern, which is the key to creating an illusion of 3-D oscillation of the objects, including dynamic texture, color and glimmer. A key distinction over the prior art, in addition to the above, is that the platform does not rotate, but oscillates, as it would not function with complete rotation and the inventive image taking and processing to produce the intended results.

DETAILED DESCRIPTION

The present invention comprises a system and method for accurately photographing the surface texture, depth, and true color of an object or material using a gyroscopic platform and then displaying the resultant images on a gyroscopic viewing device, such as a mobile phone or tablet computer. Accordingly, with reference to FIGS. 1 and 2, the present invention provides a photographing system 1 comprising a platform 10, a camera arm 11, a camera 12, and one or more light sources 13. The camera 12 is mounted to the distal end of the arm 11 whereby the arm 11 is mounted at its proximal end to the platform 10 as shown. An object 14 is placed on the platform 10 for capturing of its surface texture, depth, glimmer, and true color. The platform is disposed on, and pivotably mounted to, a fulcrum support 15. The mounting of the platform in this design provides for 2 dimensions/degrees of freedom of movement as further described hereinafter. Disposed substantially toward the center of the platform is an accelerometer 16 which as appreciated by one of ordinary skill is an electronic orientation-sensing device. Light meter(s) 17 are attached to, or incorporated within, platform 10. Two linear actuators 18 and 19 control the adjustment of the surface angle of the platform.

Figure 3:
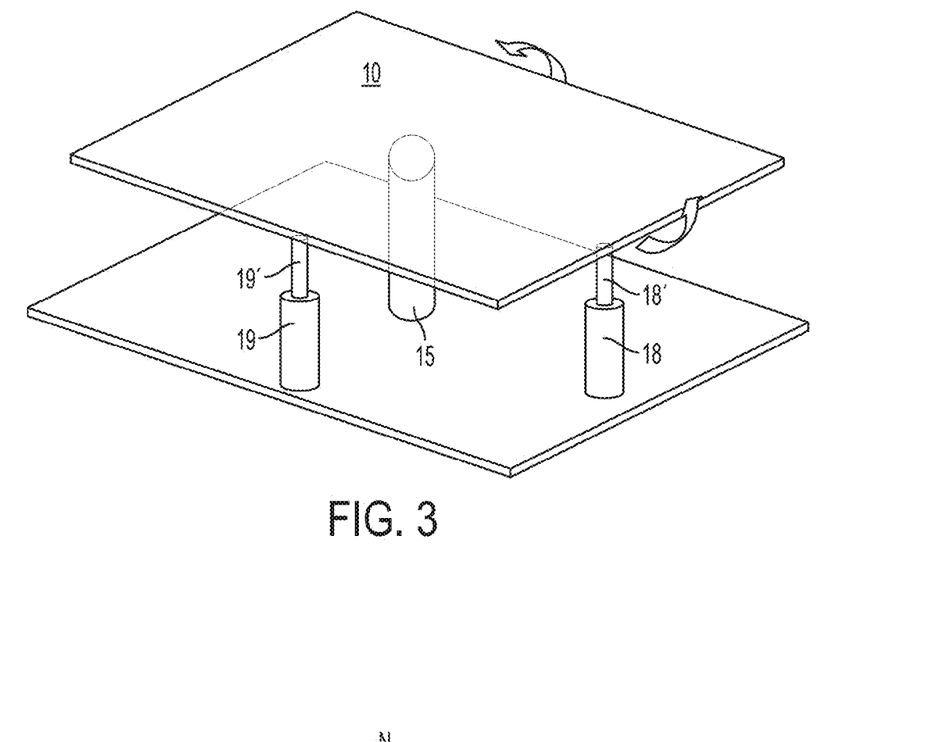
FIG. 3 is a perspective view of a representation of the platform, fulcrum support, and servo-motors utilized in the system of the present invention.

With reference to FIG. 3, the platform 10 is engaged with two step or servo-motors 18 and 19 which are configured to move the platform 10 with respect to fulcrum support 15 in order to adjust the surface angle of the platform 10. It is appreciated that motors of various types can be incorporated into the instant designs, including mechanical, electrical, hydraulic, pneumatic or otherwise. A central piston 18' and 19' or arms extend and retract linearly for movement of the platform. In some embodiments, the step motors 18 and 19 are located toward adjacent sides of the planar platform 10 and articulate up and down in a piston configuration in order to provide two degrees of freedom for the platform 10: pitch angle and roll angle. This is not to be confused with horizontal or complete rotation of the platform which would prevent operation of the instant inventions, photography system, image processing and the intended results. In some embodiments, the camera arm 11 is fixed to the platform 10 such that when the platform is moved, the camera 12 maintains its position with respect to the platform 10. In some embodiments, the camera is mounted substantially above the center of platform 10 such that the lens of the camera is substantially parallel to the surface of the platform 10. One or more light sources 13, which may include a flash, and are fixed and discrete from the platform 10 such that as the platform 10 moves by way of motors/linear actuators 18 and 19, the lighting on object 14 will change because object 14 has moved with respect to the light source(s) 13.

True color can only be captured when a light source or sources are reflected on the object at different angles capturing the reflections of the glow highlighting the finishes of the color, e.g., matte, semi-gloss, satin, and high-gloss.

The depth of texture is shown when a set of photos from the coordinates followed by the opposite and adjacent coordinates create the illusion of depth in an image by the change in shadows moving along an image path as described herein, and back and forth between the last image or a path through the instant matrix controlled by the users accelerometer or similar functional device.

Glimmer is captured by the matrix in the same way as texture is displayed allowing a set of images to highlight a subdued unsteady reflection or to appear indistinctly with a faintly luminous quality.

Figure 2:
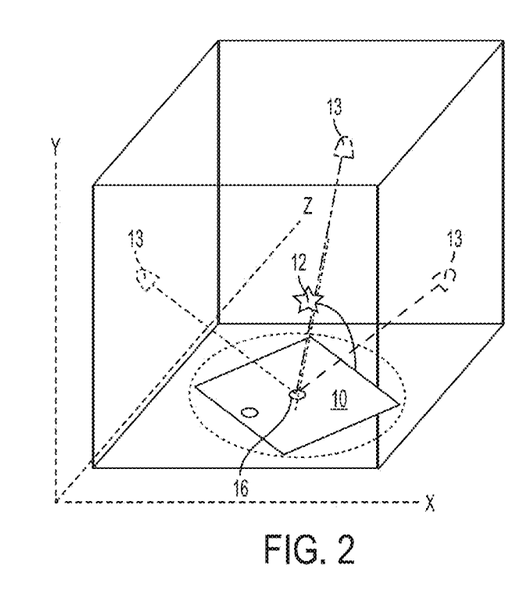
FIG. 2 is perspective diagrammatic view of an embodiment of the photographing system of the present invention.

As shown in FIG. 2, accelerometer 16 is configured to track the X, Y, and Z coordinates of the platform as its orientation changes by way of motors 18 and 19.

With reference again to FIG. 1, a central processing unit (CPU) 20 is in electrical communication with the camera 12, light source(s) 13, accelerometer 16, and servo-motors 18 and 19 to control and communicate therewith. In some embodiments, the CPU 20 is configured as part of a computing system such as a desktop, laptop, mobile device, tablet computer, or other computing workstation that generally includes a CPU 20, memory means, input/output means, communication bus and circuitry, and storage means. The camera 12, light source 13, accelerometer 16, and servo-motors 18 and 19 are in electrical communication with the CPU 20 by way of the input/output means of the computing device. Such connections may include wired and wireless connections such as serial, parallel, universal serial bus, firewire, Bluetooth, near-field communications, Wifi, and combinations thereof.

Figure 1:
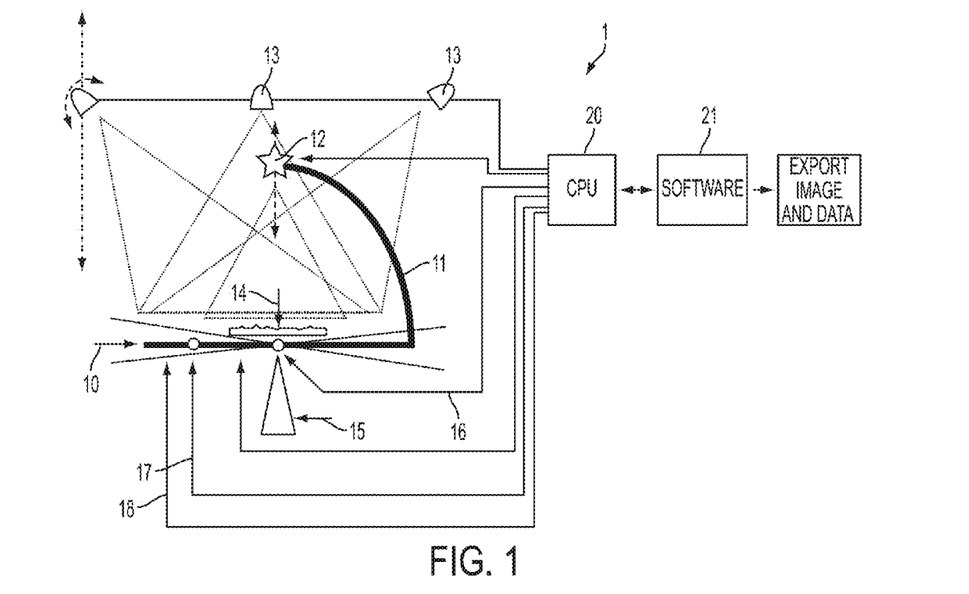
FIG. 1 is a schematic representation of one embodiment of the photographing system of the present invention.

A user interacts with software 21 executing on the CPU 20 in order to manipulate the various components of the system (camera, light source, motors) as well as to obtain photographs and other pertinent data as further discussed. The CPU 20 is configured is activate the camera 12 and light sources 13 and can also enable the motors/linear actuators 18 and 19 in order to change the orientation of the platform 10. The CPU 20 is also configured to receive data from the camera 12 (i.e. photographs) and the accelerometer 16. As discussed above, the servo-motors allow the platform to pitch and roll about fulcrum support 15. Accordingly, accelerometer 16 transmits XYZ coordinate data to the CPU 20 by way of the aforementioned electronic communication. Thereafter, the system exports images, files and data as described below.

In use, the system 1 of the present invention is configured to capture a plurality of images of object 14 at various angles and therefore various lighting conditions while simultaneously tracking the orientation of the platform 10. In some embodiments, camera 12 is activated to capture a series of images whereby the orientation of the platform is changed for each image. As the images are taken, the CPU 20 retrieves image data from camera 12 and corresponding XYZ coordinate data from accelerometer 16 and tags each capture imaged with the XYZ coordinate data. In a preferred embodiment, each image is tagged with its associated XYZ coordinate data corresponding to the position of the platform when the image was taken. The light sources 13 can also be utilized as a flash when taking one or more of the images captured. In some embodiments, the user pre-programs the computing system by determining and inputting a range of angles for platform 10 and an image capture frame rate of camera 12. Then, the system 1 executes the capturing process, capturing images and transmitting image data and its associated XYZ coordinate data to the CPU for recordation and processing.

Once the images and corresponding XYZ coordinate data are obtained, the system and method of the present invention processes the data through an imaging algorithm or mapping program which results in a compiled image in a proprietary file format that can viewed on a viewing device having its own internal accelerometer/gyroscope. The file format allows the viewing device to display the compiled images in a dynamic fashion wherein the user manipulates and moves a viewing device, causing the accelerometer to move, and therefore alter the images read from the file format on screen to recreate the surface texture, depth, glimmer, and true color of the object 14 being viewed.

Figure 4:
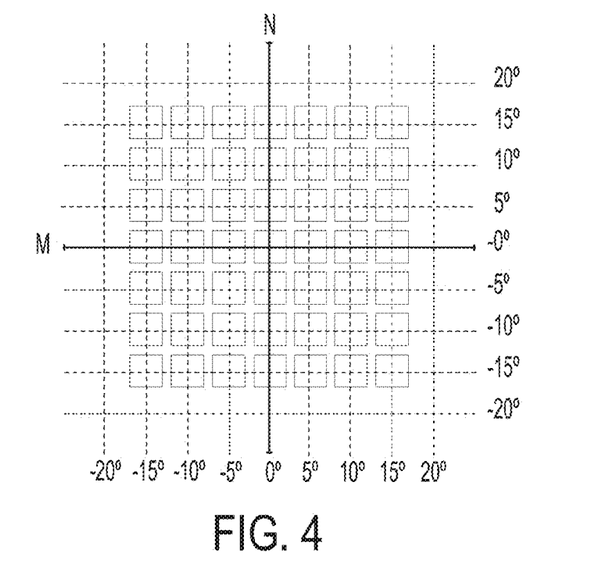
FIG. 4 is a graphic grid representation of the file format of the present invention.
Figure 5:
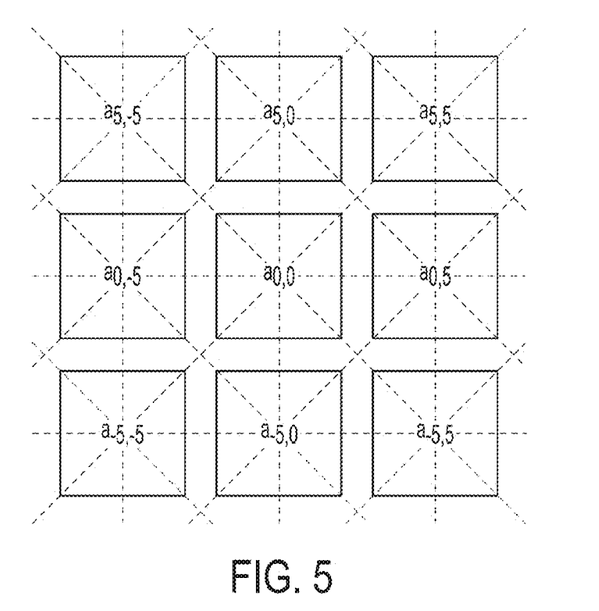
FIG. 5 is a diagrammatic representation of certain image coordinates used in the file format of the present invention.

For example, compiling a set of images wherein each successive image is following by an image having opposite and adjacent coordinates will create the illusion of depth in the image when the images are moved along a path back and forth between it and a previous image. In some embodiments, the images are processed by generating an image matrix of size M×N which is obtained by converting the XYZ values into a 2-dimensional matrix of Z values shown for example in FIG. 5. A set of images, tagged with XYZ data at a range of degrees placed into the M×N matrix. A change in coordinates moves away from 00 (the center) and more images are needed to fill the gaps. The images placed into the M×N matrix create a pattern leaving one image at each of the four ends of a particular geometric shape M×N matrix with 00 as the center image, as shown in FIG. 4. Each of the four end points coordinates displays the image corresponding to the farthest coordinate on that axis.

Figure 6:
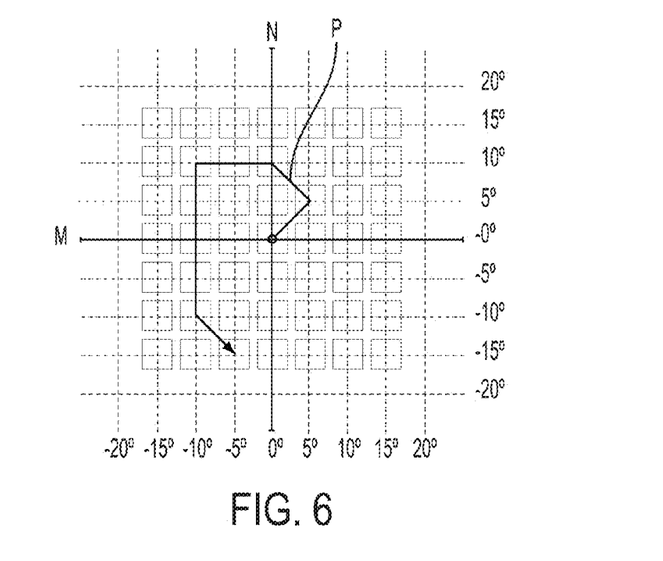
FIG. 6 is a diagrammatic representation of an accelerometer path generated over a file format representation shown in FIG. 4.

A user viewing the images on a viewing device enabled with its own accelerometer, such as a mobile smart telephone or tablet computer, can manipulate the device to manipulate the images viewed on the screen. An image display path is generated as the user device's accelerometer changes, which establishes an accelerometer "event," with the XYZ data of the viewing device's accelerometer prompting a change to the XYZ data of the images to be viewed. This causes all of the images along the path through the M×N matrix to be displayed in successive fashion as the path progresses, creating an image sequence that appears to be the object 14, with enhanced surface texture, depth, glimmer, and true color. For example, as shown in FIG. 6, the accelerometer/gyroscope of the user's viewing device will dictate the path P of the images shown on the device. The position of the accelerometer/gyroscope of the user's device will trace a path over the M×N matrix of images, resulting in a series of images shown on the device that recreates the texture, depth, glimmer, and true color the object 14 being viewed.

Figure 7:
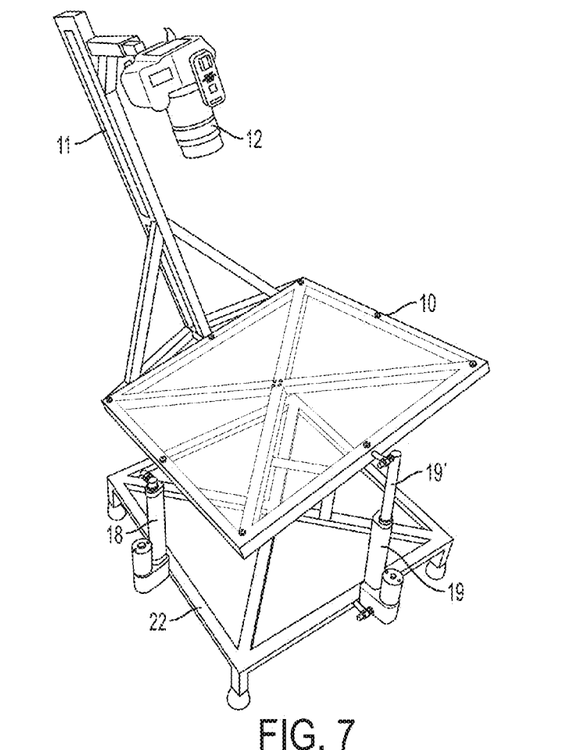
FIG. 7 is a perspective view of the photographic system, camera, platform, servo-motors and support base of the instant inventions.
Figure 8:
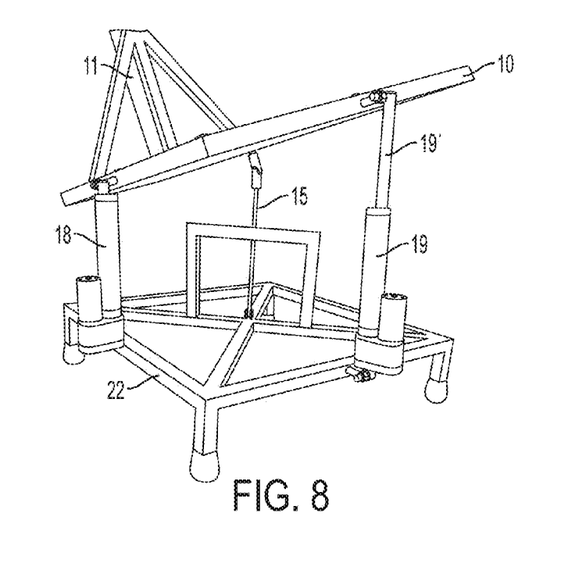
FIG. 8 is an alternative perspective view of the apparatus shown in FIG. 7.

FIGS. 7 and 8 illustrate perspective views of an embodiment of the camera, platform and frame system of the instant inventions. Camera 12 is mounted above and positioned away from platform 10 by frame member and camera arm 11. As mentioned, the camera lens secured in position to be generally parallel with the flat surface of platform 10. Servo-motors 18 and 19 control the angular movement of the platform in their respective dimension or degree of movement. Fulcrum 15 is pivotably secured to the central area of platform 10, providing the point about which the platform oscillates, and in conjunction with the piston or arms 18' and 19' of the servo-motors provide control of the 2 dimensions/degrees of freedom of movement of the platform 10. The uppermost section of the pistons 18', 19' are pivotably secured to the platform to allow for the angular movement. Base 22 provides support for the frame assembly, servo-motors and fulcrum.

Figure 9:
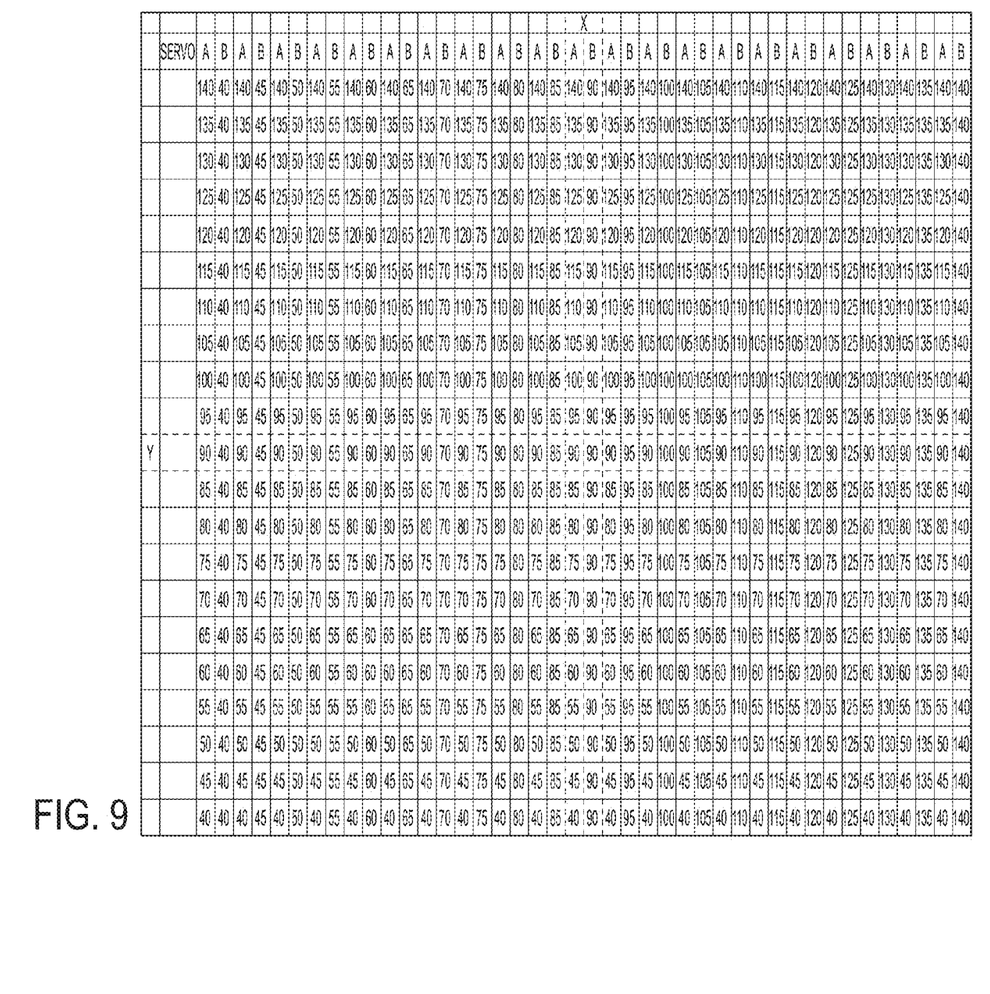
FIG. 9 is a chart representing the relative positions of the x and y servo-motors controlling the platform of the instant inventions.

FIG. 9 is chart depicting relative angular positions of the top or upper section of the motor pistons A and B with respect to the x and y axis for the various changing positions of the platform when images are taken.

Figure 10:
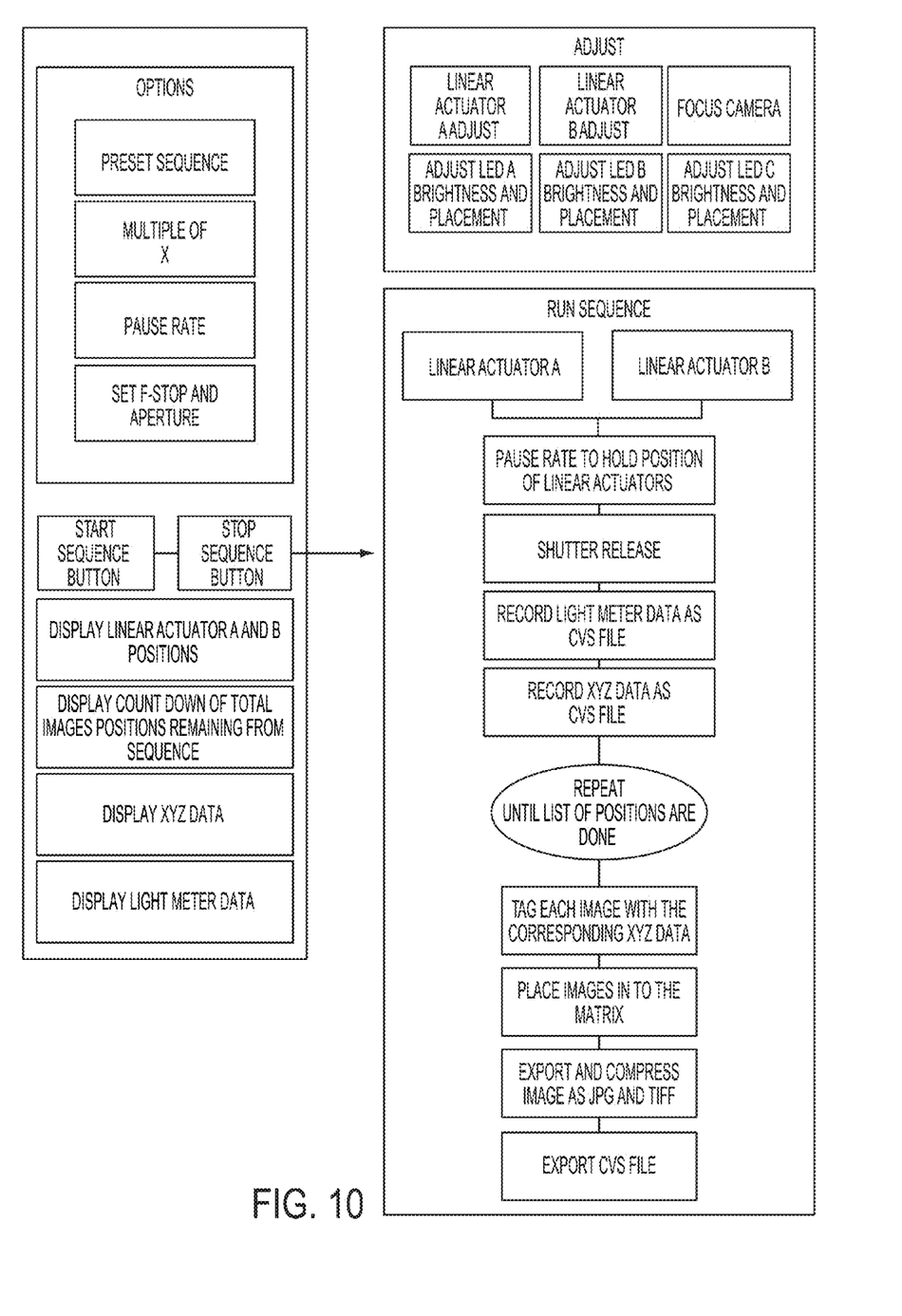
FIG. 10 is block diagram flow chart illustrating the options, adjustment controls, and run sequence of the instant inventions and methodology.

FIG. 10 is a functional block diagram and flow chart depicting the operational control and hierarchy of processes utilized in the instant system. Options for preset sequence are set with the parameters indicated along with camera F-stop and aperture settings. Initiation and termination controls are available, along with displaying the linear actuator positions, countdown of total image positions, XYZ and light meter data. Adjustment controls are utilized for components of the system described, linear actuators, camera parameters amongst others.

FIG. 10 are illustrates the run sequence of operation for a photography session in obtaining images, recording data, tagging each image with XYZ data, converting and imputing images into a matrix, exporting and compressing as image files and thereafter exporting as CVS file(s), saved image files as jpg, tiff, png, and matf or the like.

In some embodiments, converting the 3-dimensional XYZ coordinate data to 2-dimensional XY axis data allows the data to be placed in a M×N matrix like a flat map then can be navigated as if a ball is rolling around on the matrix, and each time the ball comes into contact with one of the image frames that frame is shown. The key to the illusion is the pattern created and the set of images previously photographed from exact XYZ coordinates that corresponds to the M×N matrix pattern. Due to the fact the image is the same in each photo taken, the only part that changes is how the light interacts with the surface. This allows the file size to be very small when compressed while providing enhanced recreation of surface texture, depth, glimmer, and true color.

The present system and method can be incorporated into a variety of computer-based applications to allow for dynamic viewing of an objects surface texture and true color after a series of images are captured with the photographing device and related methodology. In some embodiments, a gallery of images application is provided that comprises a standard image viewing application in accordance with the above dynamic viewing of the image matrix in response to a viewing device's accelerometer/gyroscope. In another embodiment, an augmented reality feature is provided whereby perspective is added (for example using CSS3) so that the user can display the image matrix in 3-dimensions where it appears to be floating in a room. By creating a 3D surface from the image matrix, the texture, color, and depth will appear more realistic. A UV mapping feature or application is also provided which obviates the need for traditional texture mapping. A textured art feature or application can also be provided which allows for the use of the dynamic images as backgrounds or the like on webpages. The typical still background images can be replaced with an image in the file format here which would allow for dynamic viewing of texture, glimmer, and true color while viewing a website in traditional fashion. The file format described herein can also be configured as a plug-in for design software such as Adobe Photoshop, Adobe Flash, Dreamweaver, Edge, InDesign, and Hype.

Figure 11:
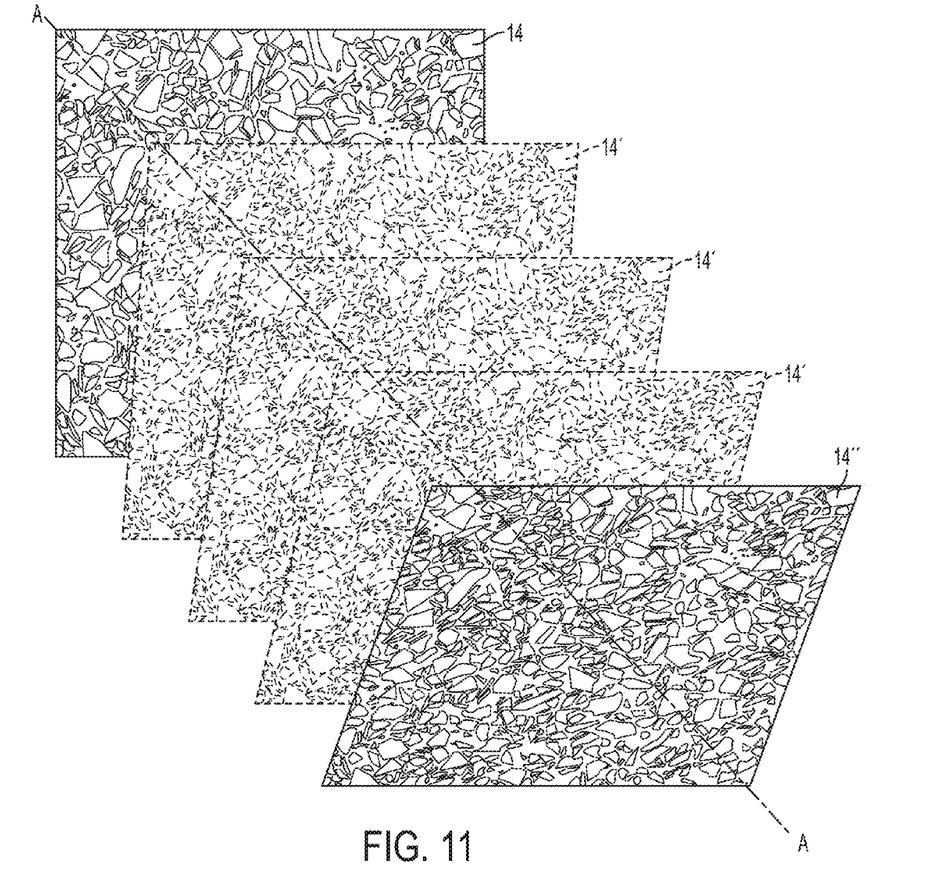
FIG. 11 is a graphic representation of a tile being photographed and processed with the instant inventive system depicting the resulting illusion of 3-D oscillation and dynamic movement on a viewing device.

With reference to FIG. 11, a graphic representation of a tile being photographed and processed with the instant inventive system is shown, depicting the resulting illusion of 3-D oscillation and dynamic movement on a viewing device. A particular stone tile 14 is illustrated in successive and continuous movements 14' until reaching a final position in this particular sequence 14". It is important to note that the tile always remains fixed in its central position along the fulcrum point and axis A-A. The methodology and processing of the instant inventions allows for the 3 dimensional (3-D) illusion of oscillating movement of the tile through processing of numerous separate images as described herein. The individual stones of the tile as well as the surface texture, color and glimmer are enhanced and change when using the viewing device to manipulate the tile by oscillation and movement in different positions. This allows for viewing different shades and features of the surface as well.

Figure 12:
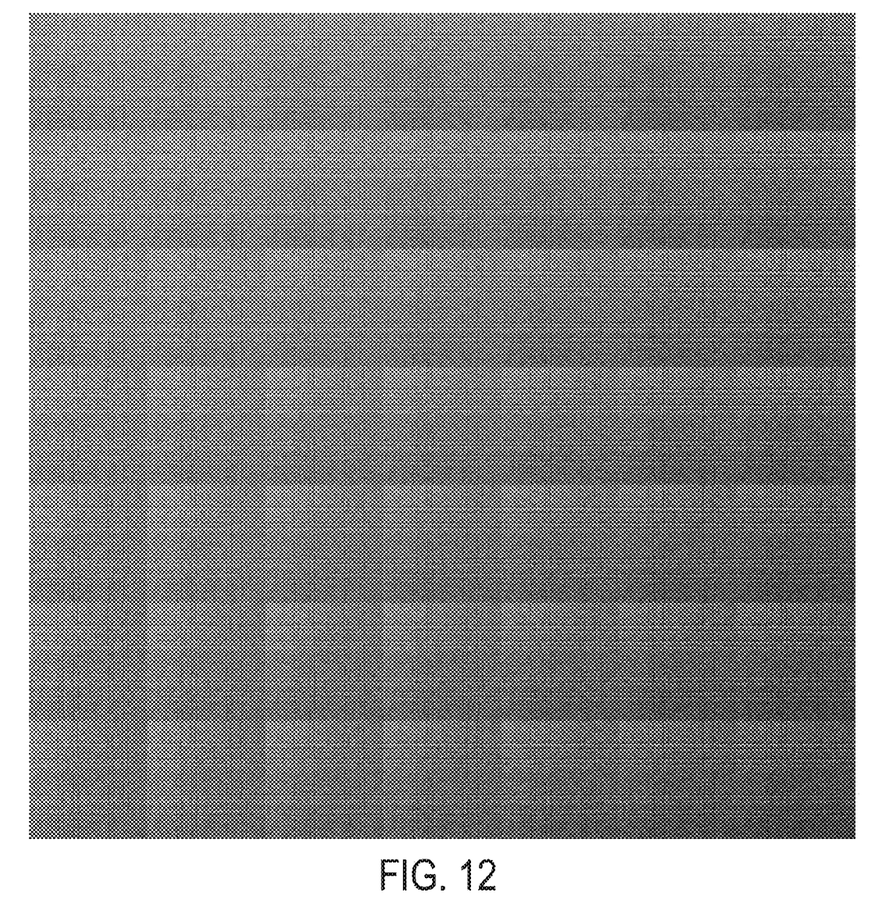
FIG. 12 is an image resulting from use of the instant inventive system illustrating an example of a true surface, texture, color and glimmer.

FIG. 12 is an image of a tile resulting from use of the instant inventive system illustrating an example of a true surface, texture, color and glimmer, as well as shading in a particular orientation of the tile. A viewer can manipulate the tile through use of his/her finger on smart phone or iPad, mouse for a computer, 3D accelerometer and interact via the internet and Websites or Apps.

It is appreciated that the present system and method is adaptable for use with a wide variety of computer systems including networked and cloud-based computing systems. This could allow a user to remotely control the photographing system 1 by way of the internet, capturing and processing images off-site. This could also allow the off-site computing system to function as a service provider for those who wish to capture detailed images but do not want to invest in the processing software. The present invention has far reaching applications in industries such as online retailers, textiles, flooring manufacturers and retailers, fashion and apparel manufacturers and retailers, jewelry, food, paint and coating manufacturers and retailers, digital design, and furniture manufacturers and retailers The instant invention has been shown and described herein in what is considered to be the most practical and preferred embodiments. It is recognized, however, that departures may be made therefrom within the scope of the invention and that obvious modifications will occur to a person skilled in the art.

What is claimed is:

1. A photographing system, comprising
a platform, a camera arm extending from said platform, a camera mounted to a distal end of said camera arm, a light source, and an accelerometer disposed substantially at the center of said platform;
said platform is disposed on and pivotably mounted to a fulcrum support;
wherein said platform is engaged with one or more step motors which are configured to move said platform with respect to fulcrum support in order to adjust the surface angle of said platform;
wherein said system is configured to capture a plurality of images of an object placed on said platform while said accelerometer tracks said surface angles of said platform; and
wherein said system is configured to accurately capture the surface texture, surface depth, glimmer, and true color of said object.

2. The system of claim 1, wherein said accelerometer is in electrical communication with a central processing unit of a computing system wherein said central processing unit is adapted to receiving platform coordinate data from said accelerometer.

3. The system of claim 2, wherein said central processing unit tags one or more of said plurality of images with said platform coordinate data corresponding to said surface angles of said platform when said plurality of images are captured.

4. The system of claim 3, wherein said one or more of said plurality of tagged images are compiled into a computer readable file format, said file format comprises an arrangement of said one or more images in a matrix based on the platform coordinate data of each of said plurality of images.

5. The system of claim 4, wherein said file format is readable on a viewing device, wherein an internal gyroscope of said viewing device manipulates said file format to display said one or more plurality of images in successive fashion in order to accurately reproduce said surface texture, surface depth, glimmer, and true color of said object.

6. The system of claim 4, wherein said images are tagged with XYZ data from said platform and converted into a M×N matrix for export in image files.

7. The system of claim 6, wherein adjacent, corresponding and opposite images for specific locations and object placement are captured and input into said matrix.

8. The system of claim 7, wherein patterns are created from discrete sets of images taken from exact XYZ coordinates that correspondence to M×N matrix patterns, creating an illusion of three dimensional oscillation of said object.

9. A photographing system, comprising
a platform, a camera arm extending from said platform, a camera mounted to a distal end of said camera arm, a light source, and an accelerometer disposed substantially at the center of said platform;
said platform being disposed on and pivotably mounted to a fulcrum support;
wherein said platform is engaged with two step motors which are configured to move said platform with respect to fulcrum support in order to adjust the surface angle of said platform;
wherein said system is configured to capture a plurality of images of an object placed on said platform while said accelerometer tracks said surface angles of said platform; and
wherein said system is configured to accurately capture the surface texture, surface depth, glimmer, and true color of said object;
said platform, camera arm, motors, and fulcrum support being mounted within a frame assembly;
said frame assembly including a base;
said platform being pivotally secured on one peripheral side to one said motor, and pivotally secured on another peripheral side to another said motor, said motors controlling the angular movement of said platform with two dimensions of freedom of movement.

10. The system of claim 9, wherein said camera lens is mounted about said camera arm in fixed position to be generally parallel to said platform, and maintains said fixed position as said platform engages said angular movement.

11. The system of claim 10, wherein said accelerometer is in electrical communication with a central processing unit of a computing system wherein said central processing unit is adapted to receiving platform coordinate data from said accelerometer.

12. The system of claim 11, wherein said central processing unit tags one or more of said plurality of images with said platform coordinate data corresponding to said surface angles of said platform when said plurality of images are captured.

13. The system of claim 12, wherein said one or more of said plurality of tagged images are compiled into a computer readable file format, said file format comprises an arrangement of said one or more images in a matrix based on the platform coordinate data of each of said plurality of images.

14. A method of processing photography for creating a dynamic illusion of three dimensional movement of an object, comprising:
mounting a camera above a generally horizontal platform, said camera having a lens which is generally fixed in parallel relationship to the surface of said platform;
controlling the angular movement of said platform with two dimensions of freedom of movement;
placing an object upon said platform and capturing a plurality of images of said object, and simultaneously tracking said angular movement of said platform;

assigning tags to said plurality of images with said platform coordinate data corresponding to said angular movement of said platform when said plurality of images are captured;

processing said plurality of tagged images and compiling into a computer readable file format, said file format comprises an arrangement of said plurality of images in a matrix based on said platform coordinate data of each of said plurality of images;

exporting said images to a viewing device, wherein an internal gyroscopic device of said viewing device manipulates said file format to display said one or more plurality of images in successive fashion in order to accurately reproduce said surface texture, surface depth, glimmer, and true color of said object.

15. The method of claim 14 wherein said images are tagged with XYZ data from said platform and converted into a M×N matrix for export in image files.

16. The method of claim 15, wherein adjacent, corresponding and opposite images for specific locations and object placement are captured and input into said matrix.

17. The method of claim 16, wherein patterns are created from discrete sets of images taken from exact XYZ coordinates that correspondence to said M×N matrix patterns, creating an illusion of three dimensional oscillation of said object.

* * * * *